(12) United States Patent
Malik et al.

(10) Patent No.: US 12,361,297 B2
(45) Date of Patent: Jul. 15, 2025

(54) SCALING OVERRIDES IN A RULES ENGINE USING A STREAMING PROBABILISTIC DATA STRUCTURE

(71) Applicant: Walmart Apollo, LLC, Bentonville, AR (US)

(72) Inventors: Sandeep Malik, Fremont, CA (US); Amit Sharma, Union City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1133 days.

(21) Appl. No.: 16/174,079

(22) Filed: Oct. 29, 2018

(65) Prior Publication Data

US 2020/0134482 A1   Apr. 30, 2020

(51) Int. Cl.
*G06N 5/025* (2023.01)
*G06N 7/01* (2023.01)

(52) U.S. Cl.
CPC ............... *G06N 5/025* (2013.01); *G06N 7/01* (2023.01)

(58) Field of Classification Search
CPC ........ G06N 5/025; G06N 7/005; G06N 20/00; G06F 21/62; G06F 21/6209; G06F 21/552; G06F 21/604; H04L 63/102; H04L 63/20; H04L 67/00
See application file for complete search history.

(56) References Cited

U.S. PATENT DOCUMENTS

| | | |
|---|---|---|
| 9,110,792 B1 | 8/2015 | Douglis et al. |
| 9,171,153 B2 | 10/2015 | Jorgensen |
| 2010/0216434 A1* | 8/2010 | Marcellino ............. H04W 4/20 455/412.2 |
| 2013/0173853 A1* | 7/2013 | Ungureanu ........... G06F 12/122 711/135 |
| 2013/0339526 A1* | 12/2013 | Ruellan ................ H04L 67/568 709/226 |
| 2014/0149105 A1* | 5/2014 | Lamba .................. G06F 40/279 704/9 |
| 2015/0143339 A1* | 5/2015 | Rajanna .................... G06F 8/70 717/123 |
| 2016/0063386 A1* | 3/2016 | Xie .......................... G06N 5/02 706/12 |
| 2016/0092312 A1* | 3/2016 | Dornquast .......... G06F 11/1435 707/692 |

(Continued)

OTHER PUBLICATIONS

Burton H. Bloom, "Sapce/Time Trade-offs in Hash Coding with Allowable Errors," ACM (1970) (Year: 1970).*

(Continued)

*Primary Examiner* — Vaishali Shah
*Assistant Examiner* — Kevin L. Smith
(74) *Attorney, Agent, or Firm* — DICKINSON WRIGHT RLLP; Hector A. Agdeppa

(57) ABSTRACT

The system can include a rules engine and one or more application systems. The rules engine can be configured to perform receiving overrides, storing the overrides in an overrides repository, generating a bloom filter using the overrides, and sending the bloom filter to the one or more application systems. The one or more application systems can be configured to perform storing the bloom filter as a cached bloom filter, receiving a request to evaluate rules and check for the overrides, and determining, using the cached bloom filter, whether to apply any of the overrides to the request.

20 Claims, 9 Drawing Sheets

(56) References Cited

U.S. PATENT DOCUMENTS

| | | | |
|---|---|---|---|
| 2016/0188623 A1* | 6/2016 | Finlay | G06F 16/2255 |
| | | | 707/690 |
| 2017/0053012 A1 | 2/2017 | Levy et al. | |
| 2017/0078163 A1* | 3/2017 | Goldfarb | H04L 45/7459 |
| 2018/0300204 A1* | 10/2018 | Amirishetty | G06F 3/06 |
| 2019/0370411 A1* | 12/2019 | Rojkov | G06F 16/90335 |
| 2020/0004536 A1* | 1/2020 | Shevgoor | G06F 9/30145 |
| 2020/0026803 A1* | 1/2020 | Gupta | G06N 7/005 |

OTHER PUBLICATIONS

Xie et al., "Indexing Bipartite Memberships in Web Graphs," IEEE/ACM (2014) (Year: 2014).*

Christian Antognini, "Bloom Filter," Trivadis AG (2008) (Year: 2008).*

Singh et al., "Bloom Filter based Optimization Scheme for Massive Data Handling in IoT Environment," Elsevier (2017) (Year: 2017).*

Guo et al., "The Dynamic Bloom Filters," IEEE (2010) (Year: 2010).*

Luo et al., "Efficient Data Ingestion and Query Processing for LSM-Based Storage Systems," arXiv (Aug. 27, 2018) (Year: 2018).*

Shi et al., Summary Instance: Scalable Event Priority Determination Engine for Large Scale Distributed Event-based System, IEEE (2012) (Year: 2012).*

\* cited by examiner

SCALING OVERRIDES IN A RULES ENGINE USING A STREAMING PROBABILISTIC DATA STRUCTURE

TECHNICAL FIELD

This disclosure relates generally to scaling overrides in a rules engine using a probabilistic data structure.

BACKGROUND

Rules can be created and modified for use in a rules systems. Some rules systems can allow creation of overrides to allow exceptions to the rules to be implemented in the rules system. Rules systems can assign an output to a set of input data based on the rules in the rules engine. One or more of the outputs can be overridden by the overrides.

BRIEF DESCRIPTION OF THE DRAWINGS

To facilitate further description of the embodiments, the following drawings are provided in which.

Figure 1:
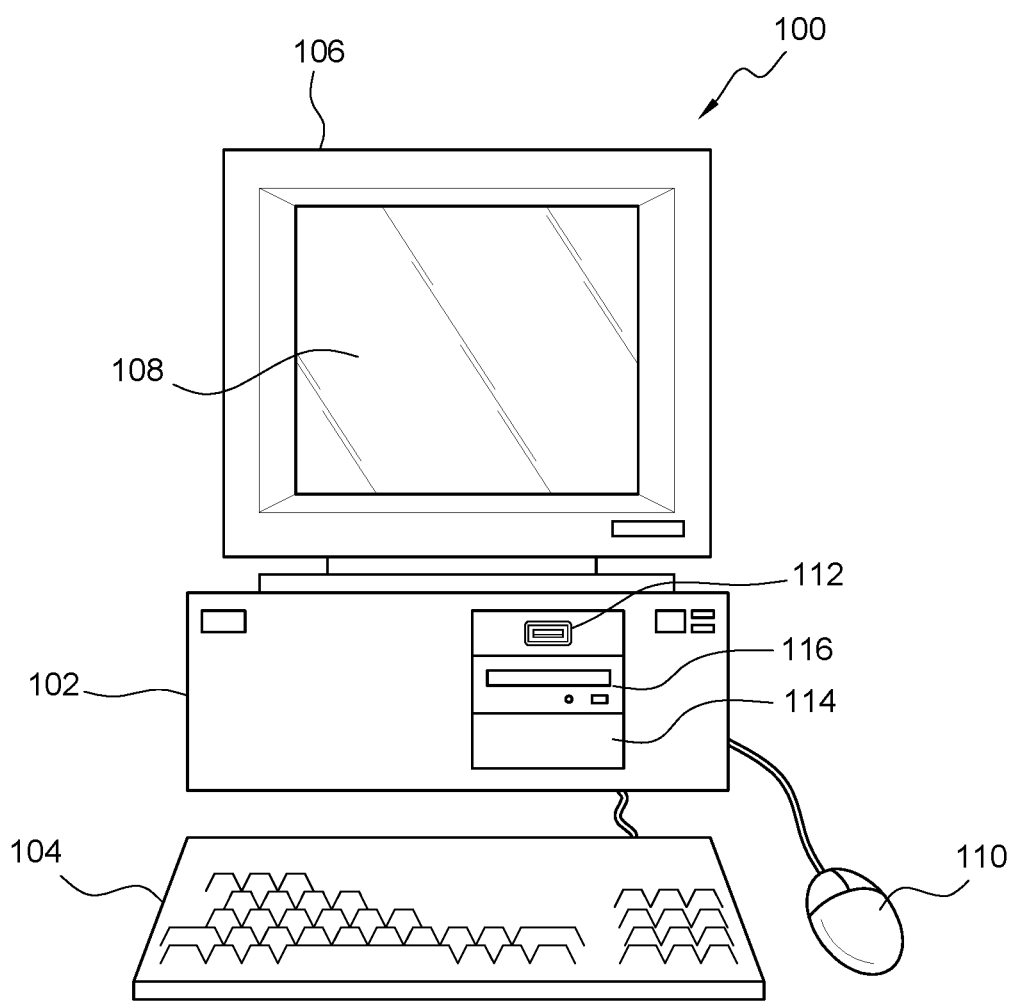
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.5 second, one second, two seconds, five seconds, and/or ten seconds.

DESCRIPTION OF EXAMPLES OF EMBODIMENTS

Figure 2:
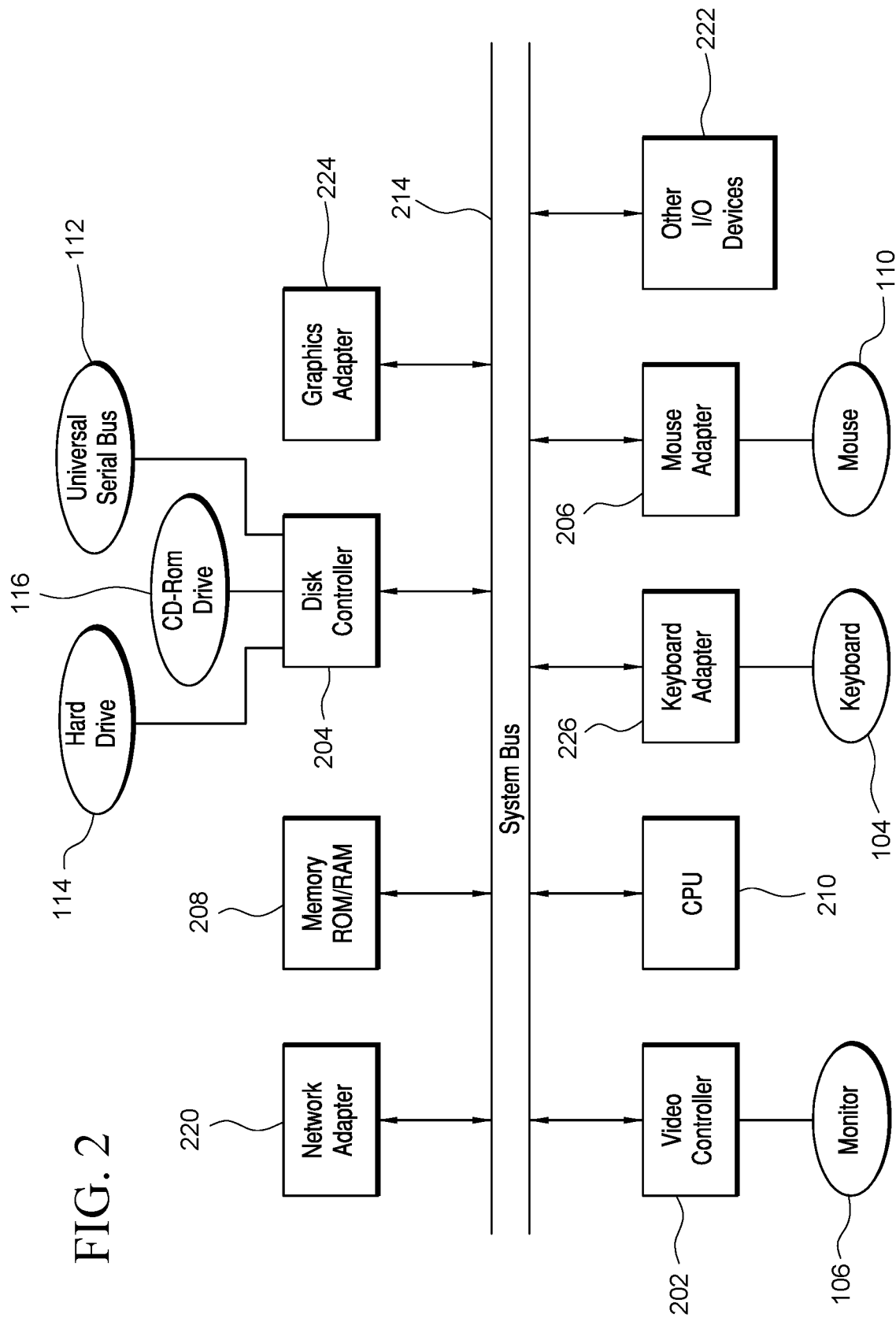
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more engines, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
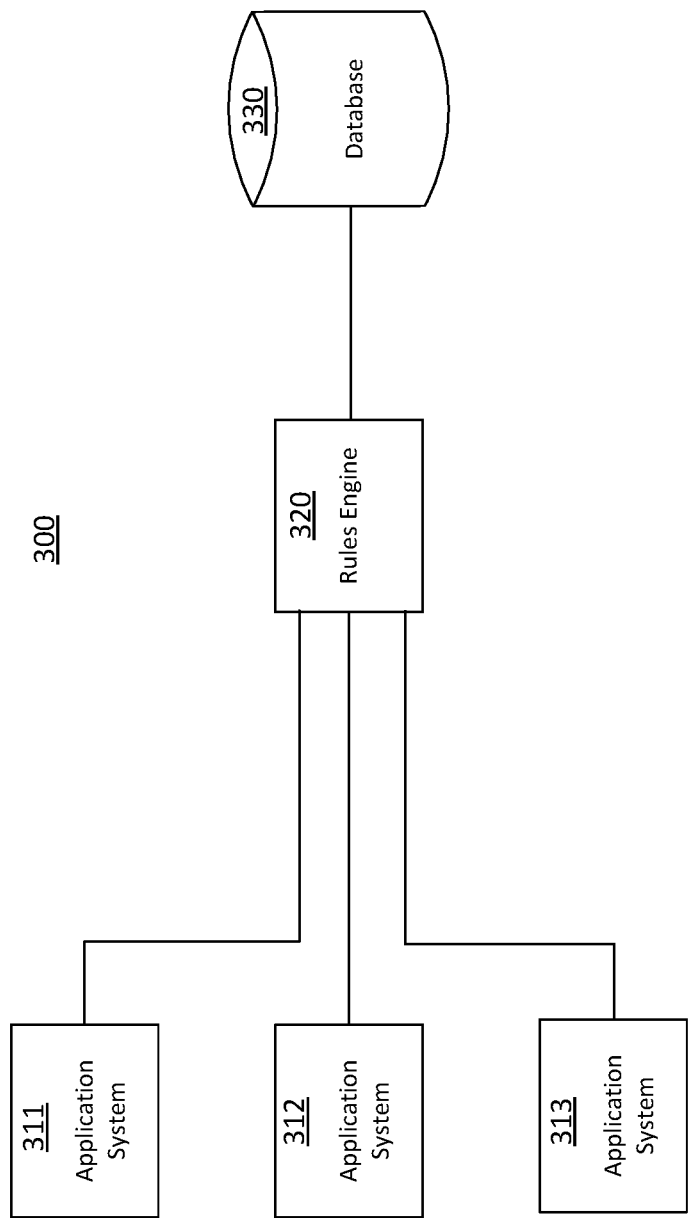
FIG. 3 illustrates a block diagram of a system, which can be employed for applying rules and overrides, according to an embodiment.
Figure 4:
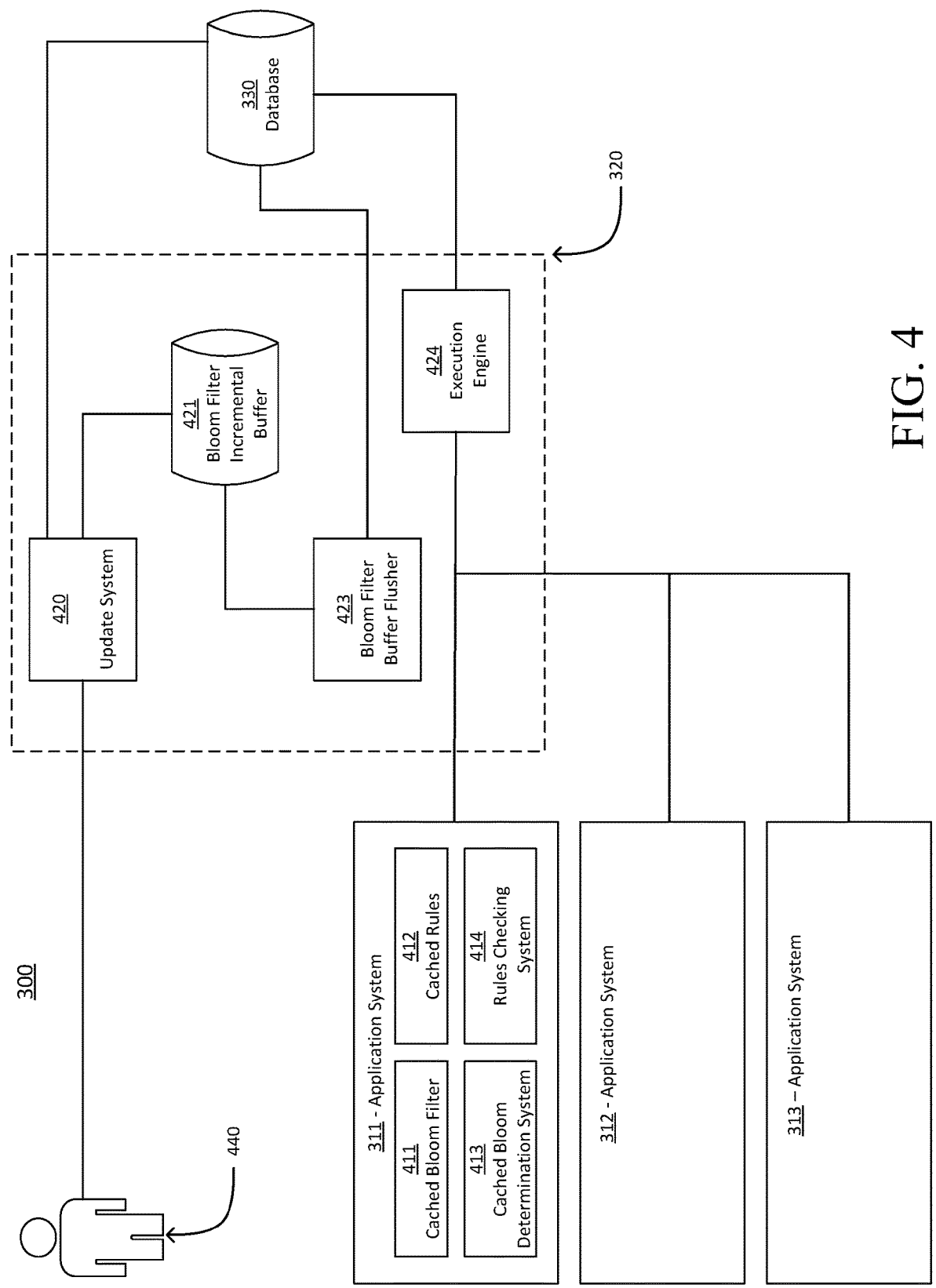
FIG. 4 illustrates a block diagram of the system of FIG. 3 showing internal subsystems of a rules engine of FIG. 3 and an application system of FIG. 3 and a user, according to an embodiment.

Turning ahead in the drawings, FIG. 3 illustrates a block diagram of a system 300, which can be employed for applying rules and overrides. FIG. 4 illustrates a block diagram of system 300 showing internal subsystems of rules engine 320 and application system 311 and a user 440. System 300 is merely exemplary and embodiments of the system are not limited to the embodiments presented herein. The system can be employed in many different embodiments or examples not specifically depicted or described herein. In some embodiments, certain elements, engines, or systems of system 300 can perform various procedures, processes, and/or activities. In other embodiments, the procedures, processes, and/or activities can be performed by other suitable elements, engines, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

As shown in FIGS. 3-4, in some embodiments, system 300 can include one or more application systems, such as application systems 311, 312, and/or 313, a rules engine 320, and/or a database 330. In several embodiments, application systems 311-313 and/or rules engine 320 can each be a computer system, such as computer system 100 (FIG. 1), as described above, and can each be a single computer, a single server, or a cluster or collection of computers or servers, or a cloud of computers or servers. In another embodiment, a single computer system can host application systems 311-313 and/or rules engine 320.

In several embodiments, application systems 311-313, rules engine 320, and/or database 330 can each be a computer system, such as computer system 100 (FIG. 1), as described above, and can each be a single computer, a single server, or a cluster or collection of computers or servers, or a cloud of computers or servers. In another embodiment, a single computer system can host application systems 311-313, rules engine 320, and/or database 330. Additional details regarding application systems 311-313, rules engine 320, and/or database 330 are described herein. In these or other embodiments, application systems 311-313, rules engine 320, and/or database 330 can be located spatially apart from each other. In these or other embodiments, application systems 311-313, and/or rules engine 320, can communicate with database 330, and/or vice versa. Similarly, application systems 311-313 can communicate with rules engine 320, and/or vice versa.

In some embodiments, communication between application systems 311, 312, and 313, rules engine 320, and/or database 330 can be implemented using any suitable mode of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, application systems 311-313 and/or rules engine 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to application systems 311-313 and/or rules engine 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of application systems 311-313 and/or rules engine 320. In a similar manner, the processors and/or the non-transitory computer-readable media can be local and/or remote to each other.

In a number of embodiments, application systems 311-313 can be front-end systems and/or back-end systems in an enterprise system, such as a website, a search engine, an online retailer, etc. In many embodiments, applications systems 311-313 each can run one or more specific applications. For example, in some embodiments, the applications can include a rollups application, a shipping tier application, a trust and safety application, a legal and compliance application, a pick-up eligibility application, a ship-to-home suppression application, a pick up discount application, a ship pricing application, or other suitable applications.

In a number of embodiments, database 330 can store overrides and rules in one or more databases, repositories, or other data structures. Database 330 can be stored on one or more memory storage units (e.g., non-transitory computer readable media), which can be similar or identical to the one or more memory storage units (e.g., non-transitory computer readable media) described above with respect to computer system 100 (FIG. 1). In some embodiments, for any particular database of database 330, that particular database can be stored on a single memory storage unit or the contents of that particular database can be spread across multiple ones of the memory storage units storing the one or more databases, depending on the size of the particular database and/or the storage capacity of the memory storage units. In many embodiments, database 330 can each include a structured (e.g., indexed) collection of data and/or can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In several embodiments, rules engine 320 can assign an output to a set of input data based on the rules that are applied by the rules engine. Rules engine 320 can retrieve the rules from database 330. In various embodiments, different rules can apply to each of the application systems (e.g., 311-313). For example, certain rules do not apply to each specific system, other certain rules can apply to one or more application systems, and/or still other certain rules can apply to every application system, as further described below. In some embodiments, rules can be shared among multiple ones of the application systems (e.g., 311-313) and can be applied to each of the multiple ones of the application systems (e.g., 311-313). In many embodiments, rules engine 320 can apply overrides to allow exceptions to a current set of rules used by rules engine 320. Rules engine 320 can retrieve the overrides from database 330.

Application systems 311-313, rules engine 320, and/or database 330 are merely exemplary and are not limited to the embodiments presented herein. Application systems 311-313, rules engine 320, and/or database 330 can be employed in many different embodiments or examples not specifically depicted or described herein. In some embodiments, certain elements or system of application systems 311-313, rules engine 320, and/or database 330 can perform various procedures, processes, and/or acts. In other embodiments, the procedures, processes, and/or acts can be performed by other suitable elements or systems. In many embodiments, the systems of application systems 311-313, rules engine 320, and/or database 330 can include systems and/or engines that include computing instructions (e.g., software components) stored at non-transitory computer readable media. In other embodiments, the systems of application systems 311-313, rules engine 320, and/or database 330 can be implemented in hardware.

In several embodiments, an application system (e.g., 311, 312 or 313) can call rules engine 320 to determine how to process certain data using rules applicable to the application system (e.g., 311, 312 or 313). For example, the application system (e.g., 311, 312 or 313) can call rules engine 320 with a data input to receive outputs based on rules or override that are applicable to the application system (e.g., 311, 312 or 313) based on the data input. In many embodiments, rules engine 320 can execute the rules in a runtime production environment. Rules engine 320 can interpret or manipulate the input data received from that the application system (e.g., 311, 312 or 313).

In several embodiments, rules engine 320 can determine that a rule applies to a data point when the data point is covered by the condition of the rule. A rule can be defined with one or more conditions and defining output or actions when the one or more conditions are met and/or are determined to be true. A rule can be defined as one or more actions based on conditions. When the conditions are evaluated as a true action or a true condition (e.g., modifying a setting, or adding a rule) certain tasks can be executed or output provided. In a number of embodiments, rules engine 320 can advantageously check a condition as to whether the conditions are true and trigger specific actions or outputs when the conditions are true. Rules engine 320 can apply various types of rules, such as score rules, mutual exclusion rules, preconditions rules, and/or other suitable types of rules. In several embodiments, the rules can include whitelist rules and/or blacklist rules. A whitelist rule r→t can assign the output t to any data point that matches the condition r. A blacklist rule r-/->t can provide that if a data point matches the condition r (e.g., an override pattern), then that data point does not have the output t. In many embodiments, the prohibition of an output provided by a blacklist rule can override the assignment of that output by one or more of the whitelist rules. In some embodiments, rules engine 320 can return an output in response to the input that can include original input data objects in which the original data objects can include modifications, new data objects, or additional output. In some embodiments of rules engine 320, the rules engine can be designed to implement a cyclical series of inputs that allows the action of one rule to cause the condition of other rules.

In many embodiments, overrides can be used to override the actions and/or output provided when rules engine 320 applies the rules. An override can be set to a specific value, such as a fixed output. For example, it can be determined that, irrespective of the output of the rules, the output should be set to a specific predetermined output. Overrides can be more time-sensitive than rules. Rules can take time to develop, and the rules generally interact with other rules, such that the output of one rule does not necessarily determine the final output after other rules are applied. By contrast, overrides can override the output of all rules, which can be useful to rapidly address a change in circumstances by overriding the rules for a certain time period or until new rules can be developed. For example, for a system that determines which items to display on a website according to the results of various rules, it can be determined that a certain item should no longer be displayed, regardless of the output of the current rules. This outcome can be achieved by using an override that sets an output to override the rules. In some embodiments, an override can be set temporarily for a predetermined period of time, as set by those that create the override. An override can be conditional based on specific parameters, but can override the output of other rules.

Rules caching in application systems (e.g., 311-313), as described below in further detail, can be used to implement some of the functionality of the rules engine locally in the application systems (e.g., 311-313). Yet such approaches nonetheless still call the rules engine (e.g., 320) to check for overrides. Such conventional approaches can be vulnerable to network failures when calling the rules engine, and to latencies in making multiple network hops from an application system to a rules engine to a database. These latencies can waste time and resources, particularly when there is no override to be applied. For example, in conventional systems, at each occurrence when an application system (e.g., 311-313) applies a rule associated with the application system (e.g., 311-313), application system (e.g., 311-313) can call a rules engine (e.g., 320) to check whether any overrides exist to override the output of the rules at the application system (e.g., 311-313). When the rules engine (e.g., 320) receives the call, the rules engine can check a database (e.g., 330) for any overrides. If the rules engine locates an override, the rules engine applies the override and sends the output to the application system (e.g., 311-313). If the rules engine (e.g., 320) does not locate an override, the rules engine has expended computing resources searching with no change in the output. In either scenario, the application system (e.g., 311-313) delays operations while awaiting the result from the rules engine (e.g., 320) to determine whether to implement one or more overrides. If the rules engine (e.g., 320) does not find an override, the application system needlessly suspends the functionality resulting in loss bandwidth and inefficiency.

By calling the rules engine (e.g., 320) to check for overrides, there is a chance that the rules engine will allocate computer resources and memory searching for non-existent overrides. In many rules engines (e.g., 320), overrides apply in a very small percentage of cases, so most of the calls to the rules engine (e.g., 320) are do not result in overrides being applied to override the output of the rules. When there are many application systems (e.g., 311-313) each regularly calling the rules engine (e.g., 320) to check for overrides, the rules engine (e.g., 320) can be a bottleneck that limits the speed at which the application system (e.g., 311-313) can operate. As an example, there can be over 20 million calls to the rules engine (e.g., 320) in a twenty-four hour period to check for overrides, and less than 20,000 of those calls actually resulted in an override being applied, which can involve wasted resources in a vast majority of the calls.

Referring to FIG. 4, in many embodiments, each of the application systems (e.g., 311-313) can include various components and/or systems. For example, application system 311 can include a cached bloom filter 411, cached rules 412, a cached bloom determination system 413, and/or a rules checking system 414. Application systems 312 and/or 313 can be similar or identical to application system 311, and various components or systems of application systems 312 and/or 313 can be similar or identical to various components or systems of application system 311.

In a number of embodiments, cached bloom filter 411 can be a bloom filter that is created by rules engine 320 and streamed to application system 311, as described below in further detail, to provide a probabilistic data structure representing whether an override might exist. In many embodiments, cached bloom determination system 413 can use cached bloom filter 411 to determine whether to call rules engine 320 to check for overrides, as described below in FIG. 5 in further detail.

In many embodiments, cached rules 412 can be a set of rules that are applicable to application system 311. Cached rules can be received from rules engine 320. In many embodiments, rules checking system 414 can apply the rules stored in cached rules 412.

In a number of embodiments, rules engine 320 can include update system 420, a bloom filter incremental buffer 421, a bloom filter buffer flusher 424, an execution engine 424, and/or other suitable components and/or systems. In many embodiments, execution engine 424 can create a bloom filter using the overrides in an override repository in database 330 that stores all of the current overrides. Conventional bloom filter generation approaches can be applied to the set of overrides in database 330 to generate a bloom filter. The bloom filter can provide a probabilistic data structure indicating whether an override might be included within the set of overrides stored in database 330. In accordance with conventional bloom filter technology, false positives (i.e., indicating that an override might be included when it is not) are possible, but false negatives (i.e., indicating that an override is not included when it is) are not possible. The bloom filter does not include the overrides and uses less memory than the amount of space that would be used to conclusively determine, without false positives or false negatives, whether or not the override is included in the set of overrides.

In many embodiments, execution engine 424 can store the bloom filter in database 330. In several embodiments, execution engine 424 can stream the bloom filter to the application systems (e.g., 311-313), which can be stored, for example, in cached bloom filter 411 in application system 311. In a number of embodiments, execution engine 424 can stream the rules from database 330 to the application systems (e.g., 311-313). In many embodiments, execution engine 424 can customize the bloom filter and/or rules sent to each of the application systems (e.g., 311-313) based on the rules and/or overrides that are relevant to the application system (e.g., 311-313). For example, execution engine can create a separate bloom filter for each of the application systems (e.g., 311-313) to be streamed to the application system (e.g., 311) and stored in the cached bloom filter (e.g., 411), and/or can create a separate set of rules for each of the application systems (e.g., 311-313) to be stored in to be streamed to the application system (e.g., 311) and stored in the cached rules (e.g., 412).

In certain embodiments, update system 420 can receive updates from user 440 to create or modify existing rules or overrides stored in database 330. In many embodiments, update system 420 can receive new rules and/or modified rules, which constitute incremental rules updates, and/or can receive new overrides and/or modified overrides, which constitute incremental override updates. In a number of embodiments, update system 420 can store these incremental rules updates and incremental override updates to the rules database 330 in real-time and/or store the incremental override updates to bloom filter incremental buffer 421 in real-time. In many embodiments, database 330 can include all of the rules and overrides, including the incremental rules updates and the incremental override updates received from update system 420. In several embodiments, bloom filter incremental buffer 421 can store the incremental override updates received from update system 420, but not store the incremental rules updates or all of the rules and overrides.

In several embodiments, when incremental override updates are received in bloom filter incremental buffer 421, bloom filter buffer flusher 423 can create an incremental bloom filter update in real-time based on the incremental override updates. In many embodiments, bloom filter buffer flusher 423 can store the incremental bloom filter update in database 330, and execution engine 424 can stream the incremental bloom filter update to the application systems (e.g., 311-313) in real-time to be stored in the cached bloom filter (e.g., 411). In several embodiments, the incremental bloom filter update can be customized for each of the application systems (e.g., 311-313), based on the overrides that are relevant to the application system (e.g., 311-313).

In many embodiments, when additional updates are received, such as from user 440, these updates can be stored in database 330 and incremental override updates can be stored in bloom filter bloom filter incremental buffer 421 as described above. In several embodiments, bloom filter incremental buffer 421 can incrementally fill, and can have multiple incremental override updates added to it before it is flushed. In many embodiments, bloom filter buffer flusher 423 can implements a flush that deletes the incremental override updates in bloom filter incremental buffer 421. In some embodiments, bloom filter buffer flusher 423 can trigger the flush on a period basis based on a predetermined period of time having elapsed since a previous flush or at scheduled predetermined times. In other embodiments, bloom filter buffer flusher 423 can trigger the flush based on a number of incremental override updates received from the previous flush exceeding a predetermined threshold (e.g., 1, 2, 3, 4, 5, 10), or another suitable number). In still other embodiments, bloom filter buffer flusher 423 can trigger the flush of the incremental override updates when bloom filter incremental buffer 421 accumulates or receives a predetermined amount of data from new update system 420 that exceeds a predetermined limit. In several embodiments, bloom filter buffer flusher 423 can flush bloom filter incremental buffer 421.

Once the flush occurs, execution engine 424 can generate a new bloom filter based on all of the overrides in database 330, including all of the overrides that were received before the flush. Execution engine 424 can store the new bloom filter in database 330, as described above for the original bloom filter, and can stream the new bloom filter in real-time to the application systems (e.g., 311-313). As described above, the new bloom filter can be customized for each of the application systems (e.g., 311-313).

In a number of embodiments, execution engine 424 can track updates to rules and overrides stored in database 330. In several embodiments, execution engine 424 can provide updates to the rules to the application systems (e.g., 311-313). In several embodiments, execution engine 424 can determine which rules and/or updates to the rules are applicable to each of the application systems (e.g., 311-313). In several embodiments, execution engine 424 can create bloom filters customized for each application system (e.g., 311-313). In many embodiments, execution engine 424 can retrieve the bloom filter and/or incremental bloom filter updates from database 330 and stream these bloom filters to one or more application systems 311-313. In many embodiments, execution engine 424 can poll database 330 throughout the day, such as on a pre-determined time interval set in rules engine 320, to detect updates to overrides and/or rules in database 330. In other embodiments, execution engine 424 can receive a notification when database 330 receives an incremental bloom filter update from bloom filter buffer flusher 423. In some embodiments, when bloom filter buffer flusher 423 executes a flush, execution engine 424 can be notified, such that execution engine 424 generates a new bloom filter based on all of the overrides in database 330. In a number of embodiments, execution engine 424 can receive calls from the application systems (e.g., 311-313) to check whether an override exists, such as when cached bloom determination system 413 uses cached bloom filter 411 to determine that an override might exist.

In some embodiments, the applications systems (e.g., 311-313) can call execution engine 424 to receive a new bloom filter and/or incremental bloom filter updates that are applicable to the application system (e.g., 311-313). In many embodiments, cached bloom filter 411 can be updated with bloom filter and/or incremental bloom filter updates received from the execution engine 424.

In many embodiments, rules engine 320 can provide an interface, such as a web server, for users, such as user 440, to create and/or modify rules and/or overrides, in addition to other suitable activities. In some embodiments, the web server can be in data communication, such as through the Internet, with one or more user computers (not shown), which can be similar to computing system 100 (FIG. 1). In some embodiments, the user computers can be used by users, such as user 440. In many embodiments, the web server can host a website that allows users (e.g., user 440) to create, modify, browse, and/or search for rules and/or overrides, in addition to other suitable activities. In a number of embodiments, when rules and/or overrides are created or modified, they can be assigned to one or more categories, which can be used to determine whether the rules and/or overrides are relevant to each specific one of the application systems (e.g., 311-313).

In many embodiments, database 330 can include an override repository or other database system. In some embodiments, database 330 can store a bloom filter, rules, overrides, incremental rules updates, incremental override updates, and any other suitable data related to application systems 311-313. Database 330 can store updates from update system 420. Database 330 can store incremental bloom filter updates from bloom filter buffer flusher 423. Database 330 can delete an old bloom filter and incremental bloom filter updates to replace them with a new bloom filter from execution engine 424.

In some embodiments, system 300 can beneficially implement a cached bloom filter (e.g., 411) in the application systems (e.g., 311-313) to determine whether or not an override applicable to the applications system (e.g., 311-313) might be in database 330. If cached bloom filter 411 indicates that the override might be in database 300, rules engine 320 can be called to check for whether the override is actually in database 330, and if the override is in database 300, rules engine 320 can apply the override.

In many embodiments, the techniques described herein can advantageously decrease calls to rules engine 320 and free up computational resources in system 300 to be used for other processing while maintaining consistent application of the rules and overrides. The techniques described herein can beneficially apply to processing multiple rules and/or overrides. In many embodiments, rules can be streamed to application systems (e.g., 311-313), where the rules can be applied. Once an override is set in rules engine 320, a bloom filter and/or incremental bloom filter update can be streamed to the application systems (e.g., 311-313) in real-time, so that the override can be checked for and applied immediately. Once the rules engine streams the bloom filter and/or incremental bloom filter update to the relevant application system (e.g., 311-313), cached bloom filter 411 can be updated. In many embodiments, when checking rules at the application system (e.g., 311-313), rules checking system 414 can be used to apply cached rules 412, and cached bloom determination system 413 can use cached bloom filter 411 to determine whether to call rules engine 420 to check for overrides. When the application system (e.g., 311-313) calls rules engine 320 to check for an override, and the override is found, this information can be received and stored by the application system (e.g., 311-313) so that the application system (e.g., 311-313) does not call to check for that override again, until there is an update to cached bloom filter 411 based on receiving a new bloom filter or an incremental bloom filter update, which can advantageously further decrease the number of calls to rules engine 320.

The techniques described herein can advantageously allowed overrides to be applied in real-time for application systems that apply rules locally. In many embodiments, by implementing a cached bloom filter 411 specific to each application system in one or more application systems 311-313, each application system (e.g., 311-313) can significantly decrease the number of calls to rules engine 320 to check for overrides specific to the application system, which can decrease time spent checking for overrides and the bottleneck in rules engine 320. In many embodiments, the application system (e.g., 311-313) will not call rules engine 320 if cached bloom filter 411 indicates that the overrides does not exist. In several embodiments, cached bloom determination system 413 can determine in most cases that the override does not existing. For example, in some applications there can be a greater than 99% probability that an override does not exist.

In several embodiments, by executing a cached bloom determination system 413, application system 311-313 can determine if an override might exist. Once it is determined that an override might exist in database 330, rules engine 320 can be called to check whether the override in fact exists. In many embodiments, the techniques described herein can significantly reduce a storage footprint even as the demand for the application systems and additional application systems continue to grow. By maintaining extremely low latencies of the system irrespective of the number of overrides in play for each application system, the system is able to support a growing catalog of items as well as a growing body of users to the system in real-time. The techniques described herein can facilitate on-boarding of new rules without significant amount of computer resources. The techniques described herein can avoid network hops in many instances. By executing a cached bloom filter in each application system, the techniques described herein can support the call volumes to the rules engine that are relevant to the application systems reducing the use of computer resources and increasing the number of current overrides to be applied by one or more application systems.

Figure 6:
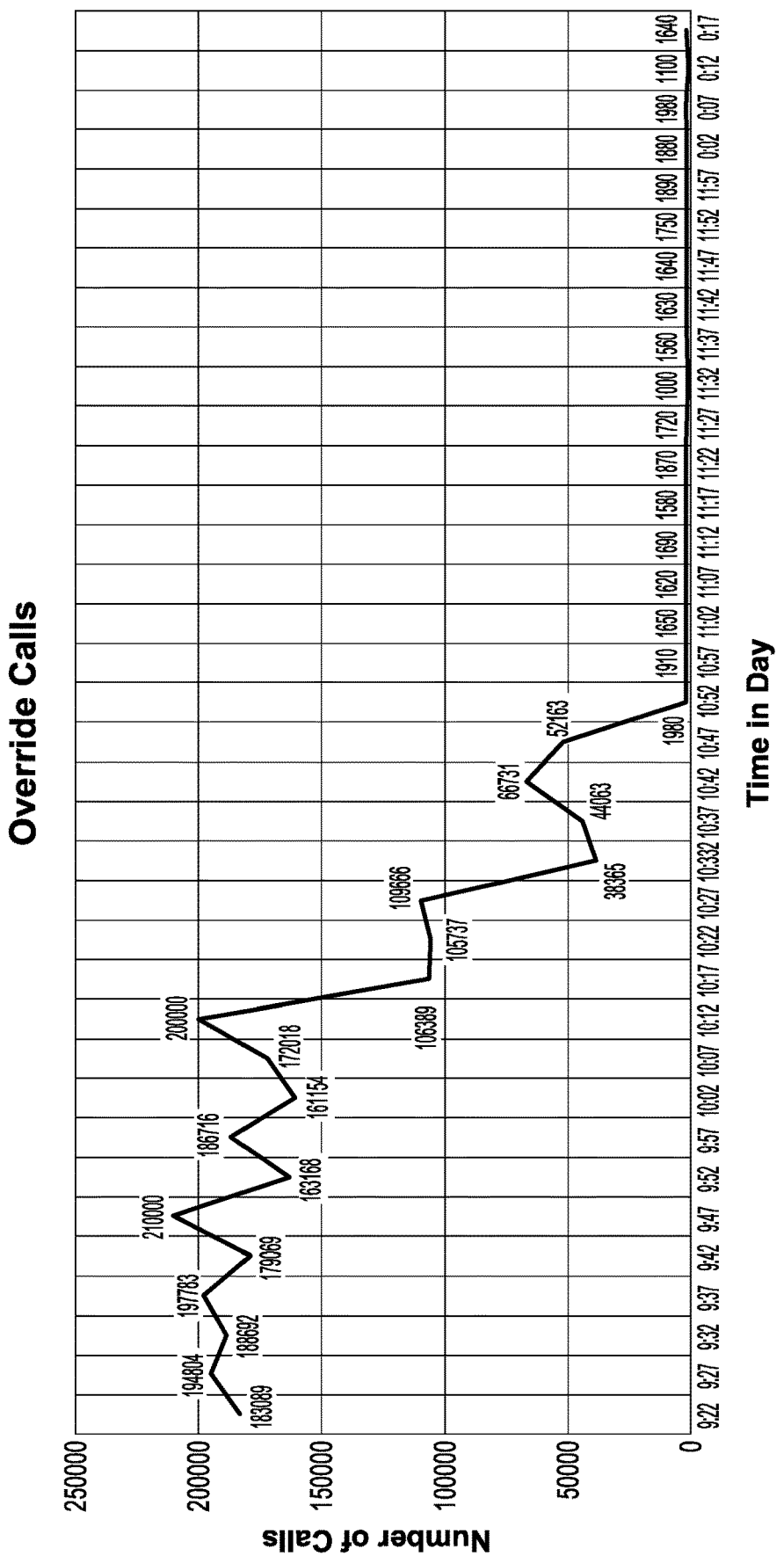
FIG. 6 illustrates a graph showing experimental results for a number of calls received by a rules engine to check for overrides before and after implementing a cached bloom filter.
Figure 7:
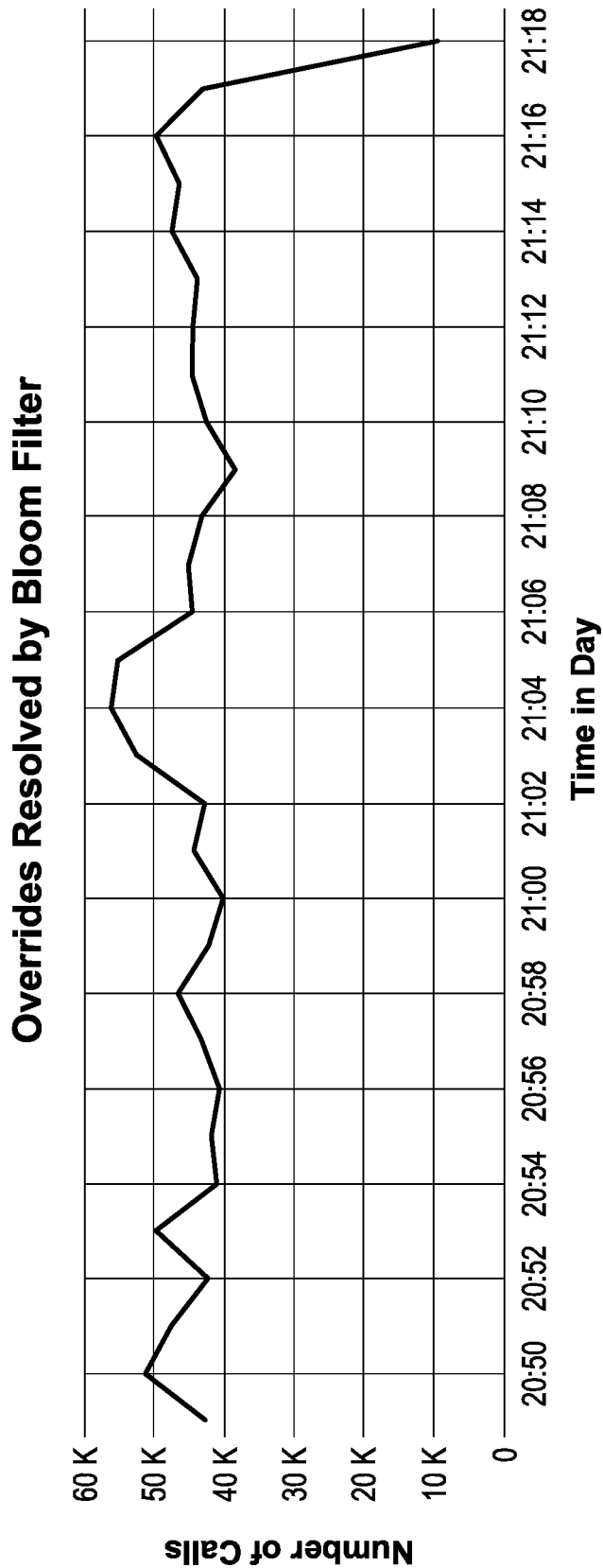
FIG. 7 illustrates a graph showing experimental results of a number of calls to a cache bloom filter in which the cache bloom filter indicates that the override might exist is false.
Figure 8:
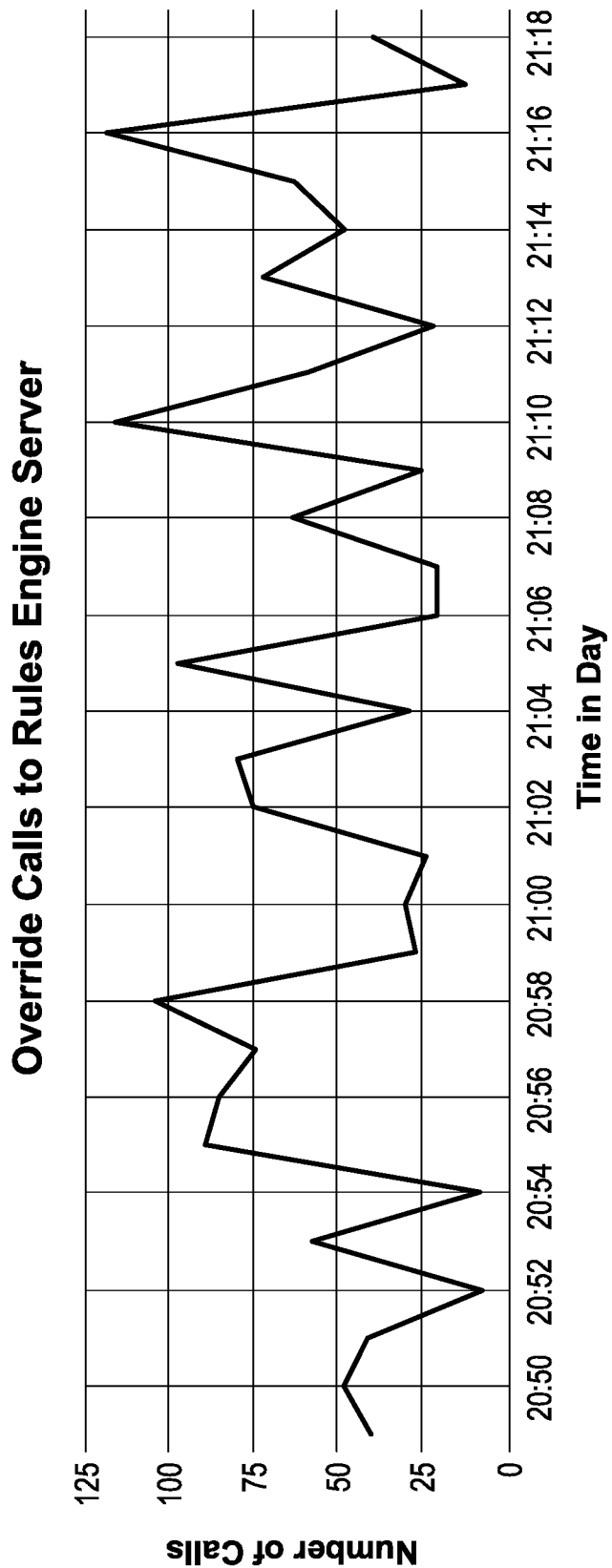
FIG. 8 illustrates a graph showing experimental results of a number of calls to a cache bloom filter in which the cache bloom filter indicates that the override might exist is true.

In several embodiments, the techniques described herein can provide a technical improvement to system involving rules engines (e.g., 320) by scaling overrides using bloom filters in each of the application systems (e.g., 311-313). These overrides can be implemented in a distributed manner across the application systems (e.g., 311-313) in real-time by updating and caching the bloom filter in the application systems (e.g., 311-313) in real time. Cached bloom filter 411 can be used to determine in most cases that the rules engine does not contain an applicable override. By executing this system in real-time, the number of calls to the rules engine can be reduced significantly, such as shown in FIGS. 6-8, and described below in further detail.

Figure 5:
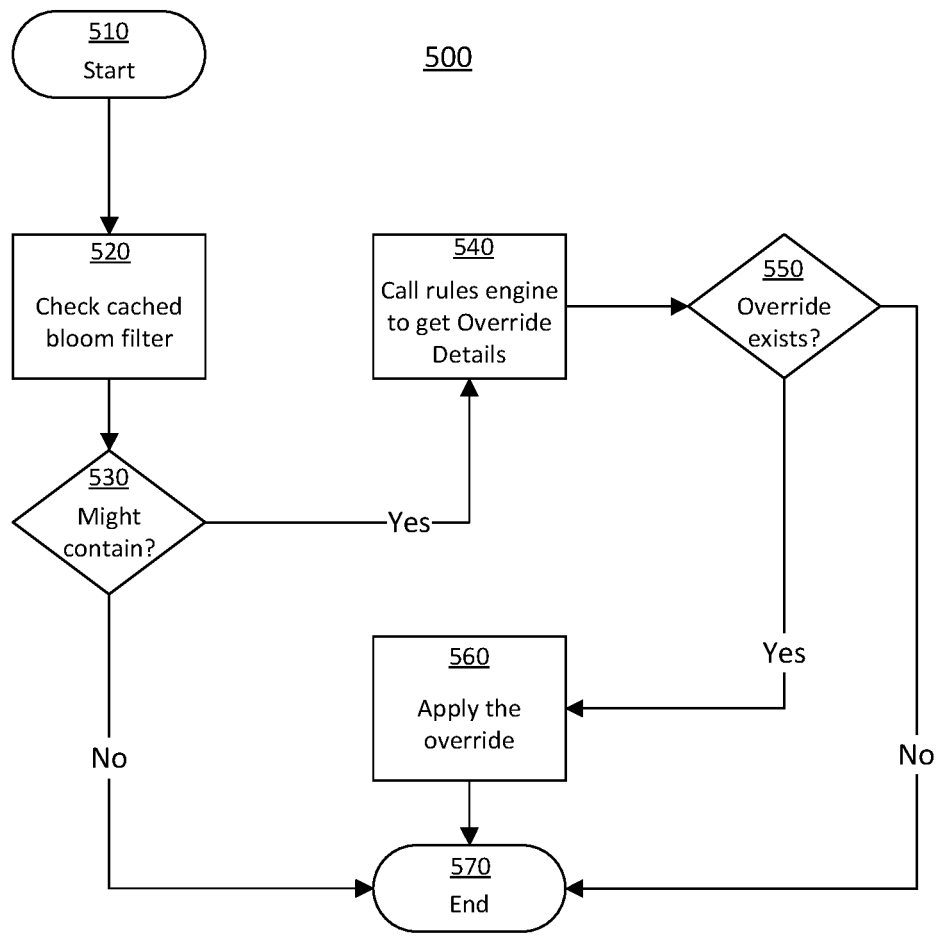
FIG. 5 illustrates a flow diagram for a method, according to an embodiment.

Turning ahead in the drawings, FIG. 5 illustrates a flow diagram for a method 500, according to an embodiment. In some embodiments, method 500 is merely exemplary and is not limited to the embodiments presented herein. The method can be employed in many different embodiments or examples not specifically depicted or described herein. In some embodiments, certain elements or system of method 500 can perform various procedures, processes, and/or acts. In still other embodiments, one or more of the procedures, the processes, and/or the activities of method 500 can be combined or skipped. In other embodiments, the procedures, processes, and/or acts can be performed by other suitable elements or systems. In these or other embodiments, one or more of the activities of method 500 can be implemented as one or more computing instructions configured to run at one or more processors and configured to be stored at one or more non-transitory computer readable media. Such non-transitory computer readable media can be part of a computer system such rules engine 320 (FIGS. 3-4) and/or application systems 311, 312 and/or 313 (FIGS. 3-4). The processor(s) can be similar or identical to the processor(s) described above with respect to computer system 100 (FIG. 1). In many embodiments, method 500 can be performed by cached bloom determination system 413 (FIG. 4) of application system 311 and execution engine 424 (FIG. 4) of rules engine 320 (FIGS. 3-4). In some embodiments, method 500 can be a method of determining whether an override exists and/or whether the override for a particular application system does not exist.

In a number of embodiments, method 500 can begin at block 510. In many embodiments, method 500 next can include a block 520 of checking a cached bloom filter. The cached bloom filter can be similar or identical to cached bloom filter 411 (FIG. 4). For example, cached bloom determination system 413 (FIG. 4) can use cached bloom filter 411 (FIG. 4) through conventional methods of applying a bloom filter to receive an output indicating "might contain" or "does not contain."

In a number of embodiments, method 500 next can include a decision block 530 to determine whether the override might exist. In certain embodiments, block 530 can be performed by cached bloom determination system 413 (FIG. 4).

In many embodiments, when decision block 530 has an output of no, meaning the override does not exist, flow can proceed in method 500 to a block 570 to end. Otherwise, when decision block 530 has an output of yes, meaning the override might exist, method 500 next can include a block 540 of calling a rules engine to get override details. The rules engine can be similar or identical to rules engine 320 (FIGS. 3-4). In certain embodiments, block 540 can be performed by cached bloom determination system 413 (FIG. 4).

In many embodiments, method 500 next can include a decision block 550 to determine whether an override exists. In certain embodiments, decision block 550 can be performed by execution engine 424 (FIG. 4) of rules engine 320 (FIGS. 3-4). For example, execution engine 424 (FIG. 4) can check database 330 (FIGS. 3-4) to see if the override exists.

In many embodiments, when decision block 550 has an output of no, meaning the override does not exist, flow can proceed in method 500 to block 570 to end. Otherwise, when decision block 550 has an output of yes, meaning that the override exists, method 500 next can include a block 560 of applying the override. In many embodiments, the override can be applied in execution engine 424 (FIG. 4). In other embodiments, the override can be applied in the application system (e.g., 311-313 (FIGS. 3-4)). In several embodiments, any overrides that exists can be cached in the application system (e.g., 311-313 (FIG. 3-4)) by cached bloom determination system 413 (FIG. 4), which can result in not calling the rules engine the next time to check for the same override, until the cached bloom filter is refreshed and/or a new bloom filter takes its place.

In many embodiments, after block 560, flow of method 500 can proceed to block 570, indicating the operations in method 500 are complete.

Proceeding to the next drawing, FIG. 6 illustrates a graph 600 showing experimental results for a number of calls received by a rules engine to check for overrides before and after implementing a cached bloom filter. The cached bloom filter (e.g., 411 (FIG. 4)) was implemented in application systems (e.g., 311-313 (FIGS. 3-4)). Specifically, graph 600 plots on the y-axis the number of calls received at a rules engine (e.g., 320 (FIG. 3-4)). The x-axis plots the time in a day starting at 9:22 a.m. to 0:17 p.m., which is approximately less than three hours in total. Graph 600 shows the number of calls reduced from a number of calls in the range of 16,000 to 21,000 before implementing the techniques described herein to a number of calls below 2,000 after implementing the techniques described herein. Specifically, graph 600 shows the experimental results achieved by implementing a cached bloom filter (e.g., 411 (FIG. 4)) in application systems (e.g., 311-313 (FIGS. 3-4)). The test results indicate that the number of calls to the rules engine was reduced post-implementation to less than 1 percent of pre-implementation levels. Based on the reduction in calls to the rules engine, the number of nodes used to support checks for overrides was reduced from 200 nodes to 20 nodes, which represents a significant resource savings. The experimental results also indicated a reduction of approximately 18 GB of data transferred over a network within less than a period of three hours due to resolution locally in most cases at the application systems.

In another test, test parameters included two million expected elements, a 1% false positive rate, 32 bytes representing the size of the key or entry, three seconds to build a bloom filter, and 2.2 MB representing the size of the bloom filter. Expected elements are defined as the number of entries in the data structure, the size of the key or entry that is represented as a number of bytes it will take in memory and/or storage.

In several embodiments, the techniques described herein can provide several technological improvements, by among other things, as depicted in graph 600 in FIG. 6, reducing the number of calls to the rules engine to less than 1% of calls prior to the deployment of the cached bloom filter, which reduces processing and network resource usage. The techniques described herein improve the speed and functionality of known computing systems by reducing the amount of calls to the ruled engine to check for overrides to less than 1% of the number of calls made before implementing these techniques.

Turning ahead in the drawings, FIG. 7 illustrates a graph 700 showing experimental results of a number of calls to a cache bloom filter in which the cache bloom filter indicates that the override might exist is false. FIG. 8 illustrates a graph 800 showing experimental results of a number of calls to a cache bloom filter in which the cache bloom filter indicates that the override might exist is true. The calls in which the override might exist is false, as shown in FIG. 7, result in the override being resolved by the cached bloom filter (e.g., bloom filter 411 (FIG. 4)), such that the rules engine is not called. The calls in which the override might exist is true, as shown in FIG. 8, result in the rules engine (e.g., rules engine 320 (FIGS. 3-4)) being called to check for overrides. FIGS. 7 and 8 show that the number of calls resolved by the cached bloom filter far exceed the number of calls made to the rules engine.

Specifically, graph 700 indicates the number of calls that, without the techniques described herein, otherwise would have been made to the rules engine (e.g., 320 (FIGS. 3-4)), but were not due to resolution by the cached bloom filter, which amounts to a reduction in the number of calls received by the rules engine (e.g., 320 (FIGS. 3-4)) of this many calls. In graph 700, the y-axis represents the number of calls that would have been made to the rules engine (e.g., 320 (FIGS. 3-4)). The time in day is plotted on the x-axis ranging from time period 20:50 p.m. to 21:18 pm, which is a period of less than thirty minutes of time.

Graph 800 indicates the number of calls received that involves calls to the rules engine (e.g., 320 (FIGS. 3-4)), indicating that the number of calls is far less (about 1%) of the amount of calls that were not made to the rules engine (e.g., 320 (FIGS. 3-4)), as shown in FIG. 8. In graph 800, the y-axis represents the number of calls received by the rules engine (e.g., 320 (FIGS. 3-4)). The x-axis represents the period of time during the day when the data was gathered from 20:50 p.m. to 21:18 pm which is a time period less than thirty minutes. As seen by FIGS. 7 and 8, the techniques described herein thus can result in system 300 more efficiently checking for overrides, by reducing the amount of calls to the rules engine, freeing up extensive computer resources and increasing bandwidth of system 300. In a number of embodiments, the techniques described herein can solve a technical problem that cannot be solved using more conventional forms of checking for overrides. In several embodiments, using cached bloom filters can allow overrides to be applied in real-time.

Figure 9:
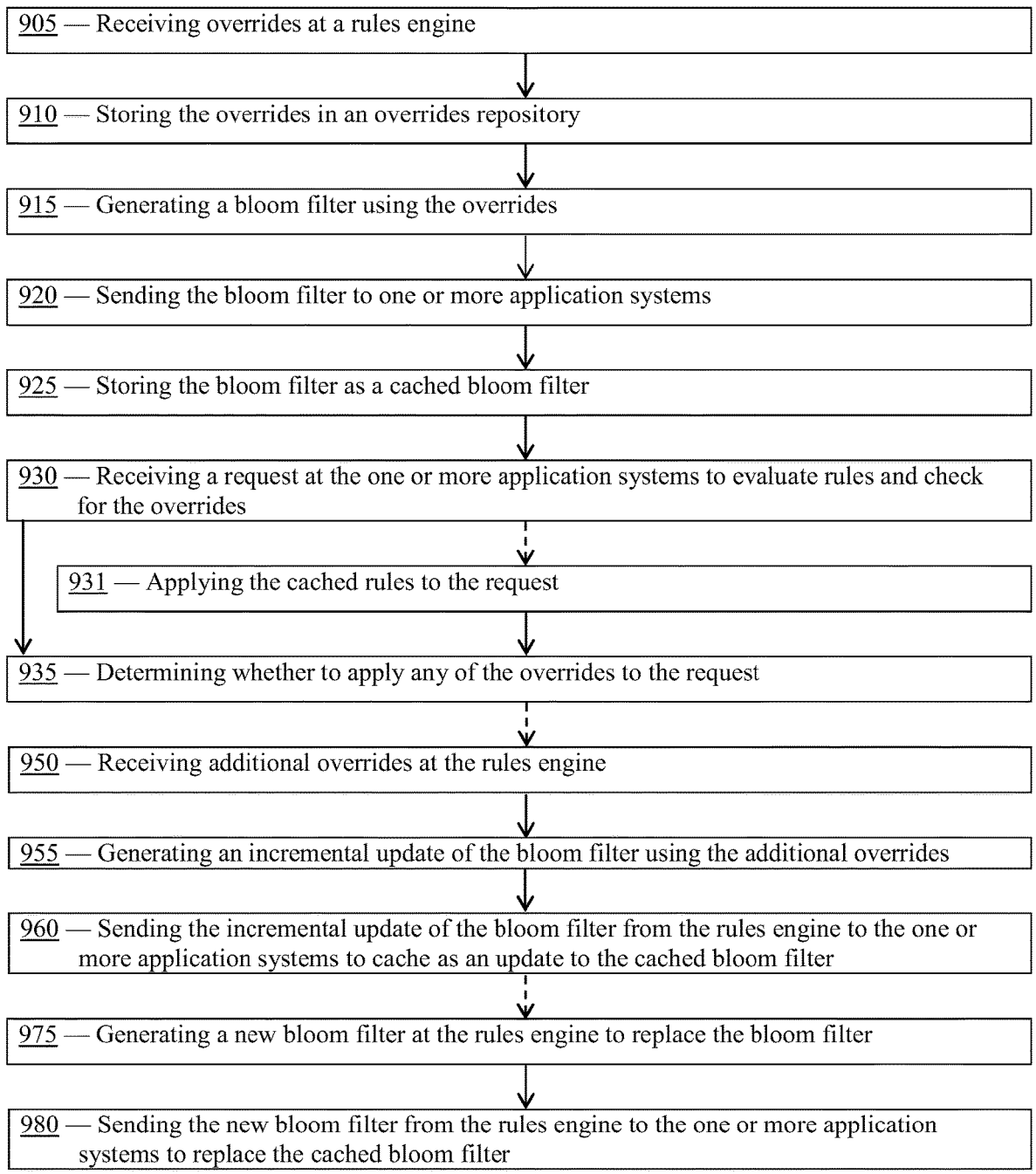
FIG. 9 illustrates a flow chart for a method, according to another embodiment.

Turning ahead in the drawings, FIG. 9 illustrates a flow chart for a method 900. In some embodiments, method 900 can be a method of scaling overrides in a rules engine using a streaming probabilistic data structure. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped.

In several embodiments, method 900 can include a block 905 of receiving overrides at a rules engine. The rules engine can be similar or identical to rules engine 320 (FIGS. 3-4). In many embodiments, the overrides can be created or modified to allow exceptions to a current set of rules being implemented in the rules engine. In many embodiments, the overrides can be received from a user at an update system of the rules engine. The update system can be similar or identical to update system 420 (FIG. 4). The user can be similar to user 440 (FIG. 4).

In a number of embodiments, method 900 also can include a block 910 of storing, by the rules engine, the overrides in an overrides repository. The overrides repository can be similar or identical database 330 (FIGS. 3-4). For example, the overrides can be stored in the overrides repository by the update system of the rules engine.

In many embodiments, method 900 additionally can include a block 915 of generating, by the rules engine, a bloom filter using the overrides. The bloom filter can be similar or identical to the bloom filter generated by execution engine 424 (FIG. 4) described above. In some embodiments, the cached bloom filter can be customized by an execution engine of the rules engine for each of one or more application systems. The one or more application systems can be similar or identical to application systems 311-313 (FIGS. 3-4). The execution engine can be similar or identical to execution engine 424 (FIG. 4). In many embodiments, the bloom filter can be created by an execution engine of the rules engine, such as execution engine 424 (FIG. 4).

In several embodiments, method 900 further can include a block 920 of sending, by the rules engine, the bloom filter to one or more application systems. The one or more application systems can be similar or identical to application systems 311-313 (FIGS. 3-4). In many embodiments, the bloom filter can be streamed to the one or more application systems.

In many embodiments, method 900 additionally can include a block 925 of storing, by the one or more application systems, the bloom filter as a cached bloom filter. The cached bloom filter can be similar or identical to cached bloom filter 411 (FIG. 4).

In several embodiments, method 900 further can include a block 930 of receiving a request at the one or more application systems to evaluate rules and check for the overrides. In a number of embodiments, the one or more applications systems can store cached rules received from the rules engine. In some embodiments, block 930 optionally can include a block 931 of applying the cached rules to the request.

In a number of embodiments, method 900 can also include a block 935 of determining, by the one or more application systems using the cached bloom filter, whether to apply any of the overrides to the request. In many embodiments, block 935 of determining whether to apply any of the overrides can include applying the cached bloom filter to determine when to call the rules engine to check for the overrides and when to not call the rules engine to check for the overrides. In many embodiments, the cached bloom filter can be applied similarly as described above in relation to cached bloom determination system 413 (FIG. 4). In several embodiments, when applying the cached bloom filter results in a determination to call the rules engine to check for the overrides, the one or more application systems further can perform calling the rules engine to check for the overrides, and applying the one or more overrides to the request when the rules engine indicates that one or more of the overrides applies to the request.

In many embodiments, method 900 optionally can include a block 950 of receiving additional overrides at the rules engine. In several embodiments, the additional overrides can be received at the update system of the rules engine. The additional overrides can be similar or identical to the incremental override updates described above. In some embodiments, the additional overrides can include new overrides. In several embodiments, the additional overrides can include modified overrides. In many embodiments, the additional overrides are stored to the overrides repository. In several embodiments, the additional overrides are buffered in an incremental buffer at the rules engine. The incremental buffer can be similar or identical to bloom filter incremental buffer 421 (FIG. 4).

In several embodiments, method 900 also can include a block 955 of generating, by the rules engine, an incremental update of the bloom filter using the additional overrides. In one embodiment, block 955 can be performed immediately after block 935 when optional block 950 is not performed. In many embodiments, the incremental update of the bloom filter can be similar or identical to the incremental bloom filter update described above. In many embodiments, the incremental update of the bloom filter can be generated by bloom filter buffer flusher 423 (FIG. 4).

In a number of embodiments, method 900 also can include a block 960 of sending the incremental update of the bloom filter from the rules engine to the one or more application systems to cache as an update to the cached bloom filter. For example, as described above, execution engine 424 (FIG. 4) can send the incremental bloom filter update to update cached bloom filter 411 (FIG. 4).

In many embodiments, method 900 further optionally can include a block 975 of generating a new bloom filter at the rules engine to replace the bloom filter. In several embodiments, the new bloom filter can be generated by the execution engine of the rules engine. In a number of embodiments, the incremental buffer can be flushed when the new bloom filter is generated. For example, bloom filter buffer flusher 423 (FIG. 4) can flush bloom filter incremental buffer 421 (FIG. 4), as described above. In some embodiments, the new bloom filter can be generated on a periodic basis.

In a number of embodiments, method 900 also can include a block 980 of sending the new bloom filter from the rules engine to the one or more application systems to replace the cached bloom filter. In some embodiments, block 980 can be performed immediately after block 960 when optional block 975 is not performed. In several embodiments, the execution engine of the rules engine can send the new bloom filter to the one or more application systems. In some embodiments, the new bloom filter can be stored in the cached bloom filter to replace any existing bloom filter and incremental bloom filter updates.

Returning to FIG. 4, in many embodiments, update system 420 can at least partially perform block 905 (FIG. 9) of receiving overrides at a rules engine, block 910 (FIG. 9) of storing, by the rules engine, the overrides in an overrides repository, and/or block 950 (FIG. 9) of receiving additional overrides at the rules engine.

In several embodiments, bloom filter buffer flusher 423 can at least partially perform block 955 (FIG. 9) of generating, by the rules engine, an incremental update of the bloom filter using the additional overrides.

In a number of embodiments, execution engine 424 can least partially perform block 915 (FIG. 9) of generating, by the rules engine, a bloom filter using the overrides, block 920 (FIG. 9) of sending, by the rules engine, the bloom filter to one or more application systems, block 960 (FIG. 9) of sending the incremental update of the bloom filter from the rules engine to the one or more application systems to cache as an update to the cached bloom filter, block 975 (FIG. 9) of generating a new bloom filter at the rules engine to replace the bloom filter, and/or block 980 (FIG. 9) of sending the new bloom filter from the rules engine to the one or more application systems to replace the cached bloom filter.

In several embodiments, cached bloom determination system 413 can at least partially perform block 925 (FIG. 9) of storing, by the one or more application systems, the bloom filter as a cached bloom filter, block 930 (FIG. 9) of receiving a request at the one or more application systems to evaluate rules and check for the overrides, and/or block 935 (FIG. 9) of determining, by the one or more application systems using the cached bloom filter, whether to apply any of the overrides to the request.

In a number of embodiments, rules checking system 414 can at least partially perform block 930 (FIG. 9) of receiving a request at the one or more application systems to evaluate rules and check for the overrides, and/or block 931 (FIG. 9) of applying the cached rules to the request.

In many embodiments, the techniques described herein can provide several technological improvements. Specifically, the techniques described herein can provide for using a probabilistic data structure to look up overrides. The bloom filters can be streamed to the application systems in real-time so that overrides can become effective immediately. The techniques described herein can provide advantages in streaming incremental override bloom filters and rules directly to the specific applications systems by caching the bloom filter in a cached bloom filter in each of the application systems in real-time. Overrides can be created by manually on a regular basis, which can have high impacts on application systems when the systems do not receive the overrides in real-time to implement the system operations. As described above, conventional approaches used by the application systems that attempt to call the rules engine do not take into account the fact that different application systems have different operations that involve different rules and overrides, which leads to the inefficient use of computer resources for the rules engine to check for rules and overrides for application systems. The techniques described herein thus provide an improvement in computer functionality beyond conventional approaches.

The techniques described herein also can run continuously to customize the selection of the overrides to apply to the one or more application systems and to update the database in real-time with incremental updates and the creation of new bloom filters to send to the one or more application systems. In many embodiments, running these techniques continuously can provide, in real-time, checking for overrides that are currently relevant to the one or more application systems, including newly created overrides.

In a number of embodiments, the techniques described herein can solve a technical problem that arises only within the realm of computer networks, as the rules engine is implemented in the context of computer networks. Moreover, the techniques described herein can solve a technical problem that cannot be solved outside the context of computer networks. Specifically, problem being solved is the bottleneck caused by multiple calls from downstream systems (e.g., application systems 311-313 (FIG. 3-4)) through the computer network to check for overrides at a central system (e.g., rules engine 320 (FIG. 3-4)).

A number of embodiments include a system. The system can include a rules engine and one or more application systems. The rules engine can be configured to perform receiving the overrides, storing the overrides in an overrides repository, generating a bloom filter using the overrides, and sending the bloom filter to the one or more application systems. The one or more application systems can be configured to perform storing the bloom filter as a cached bloom filter, receiving a request to evaluate the rules and check for the overrides, and determining, using the cached bloom filter, whether to apply any of the overrides to the request.

Various embodiments include a method. The method can include receiving overrides at a rules engine. The method also can include storing, by the rules engine, the overrides in an overrides repository. The method additionally can include generating, by the rules engine, a bloom filter using the overrides. The method further can include sending, by the rules engine, the bloom filter to one or more application systems. The method additionally can include storing, by the one or more application systems, the bloom filter as a cached bloom filter. The method further can include receiving a request at the one or more application systems to evaluate rules and check for the overrides. The method additionally can include determining, by the one or more application systems using the cached bloom filter, whether to apply any of the overrides to the request.

Additional embodiments include one or more non-transitory computer-readable media including instructions that when executed on one or more processors perform certain acts. The acts can include receiving overrides at a rules engine. The acts also can include storing, by the rules engine, the overrides in an overrides repository. The acts additionally can include generating, by the rules engine, a bloom filter using the overrides. The acts further can include sending, by the rules engine, the bloom filter to one or more application systems. The acts additionally can include storing, by the one or more application systems, the bloom filter as a cached bloom filter. The acts further can include receiving a request at the one or more application systems to evaluate rules and check for the overrides. The acts additionally can include determining, by the one or more application systems using the cached bloom filter, whether to apply any of the overrides to the request. The rules engine can include at least one of the one or more processors and the one or more application systems can include at least one of the one or more processors.

Although scaling overrides in a rules engine using a streaming probabilistic data structure has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 5 and 9 may include different procedures, processes, and/or activities and be performed by many different engines, in many different orders, and/or one or more of the procedures, processes, or activities of FIGS. 5 and 9 may include one or more of the procedures, processes, or activities of another different one of FIGS. 5 and 9. As another example, the systems within application systems 311-313 (FIGS. 3-4) and/or rules engine 320 (FIGS. 3-4) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
a rules engine comprising one or more first processors and one or more first non-transitory computer-readable media storing first computing instructions; and
one or more application systems comprising one or more second processors and one or more second non-transitory computer-readable media storing second computing instructions, wherein the one or more application systems are in communication with the rules engine via a network,
wherein:
the first computing instructions of the rules engine, when executed by the one or more first processors of the rules engine, perform:
receiving, at the rules engine, overrides of rules of a current set of rules cached in the one or more application systems that are separate from the rules engine, wherein the overrides of the rules are separate from the rules, and wherein each override of the overrides modify one or more of the rules applicable to the one or more application systems by:
implementing, via the rules engine, a respective functionality to one or more rules of the current set of rules based on one or more exceptions to the one or more rules of the current set of rules; and
checking, via the rules engine, for an existence of each of the overrides corresponding to the one or more application systems by using multiple hops from each application system of the one or more application systems to the rules engine;
storing the overrides of the rules in an overrides repository in the rules engine;
generating a bloom filter using the overrides of the rules based on a probabilistic data structure, wherein the bloom filter allows the one or more application systems to determine locally at the one or more second processors whether an override of the overrides corresponding to the one or more application systems exists without calling the rules engine; and
sending the bloom filter from the rules engine to the one or more application systems; and
the second computing instructions of the one or more application systems, when executed on the one or more second processors of the one or more application systems, perform:
receiving the bloom filter corresponding to the one or more application systems from the rules engine, wherein the bloom filter stores the one or more exceptions;
storing the bloom filter as a cached bloom filter at the one or more application systems;
receiving, at the one or more application systems, a request to evaluate the rules and check for the overrides of the rules; and
determining, at the one or more application systems using the cached bloom filter, whether to apply any of the overrides of the rules to the request by:
determining, when there is an update to the cached bloom filter, to call the rules engine to check for the overrides of the rules; and
determining, when there is no current update to the cached bloom filter, to not call the rules engine to check for the overrides of the rules and to apply any of the overrides of the rules to the request locally at the one or more second processors to thereby reduce network usage, free up computation resources at the one or more first processors, or decrease a storage footprint.

2. The system of claim 1, wherein:
after calling the rules engine to check for the overrides of the rules,
implementing, by the one or more application systems, one or more respective functionalities based on the one or more exceptions to the one or more rules of the current set of rules further based on the one or more of the overrides.

3. The system of claim 1, wherein:
the one or more application systems further store cached rules received from the rules engine;
the probabilistic data structure further comprises a streaming probabilistic data structure; and
the second computing instructions, when executed on the one or more second processors of the one or more application systems further perform:
applying, by the one or more application systems, the cached rules to the request.

4. The system of claim 1, wherein the cached bloom filter is customized by an execution engine of the rules engine for each of the one or more application systems.

5. The system of claim 1, wherein the first computing instructions, when executed on the one or more first processors of the rules engine further perform:
receiving, at the rules engine, additional overrides of the rules corresponding to the one or more application systems;
generating an incremental update of the bloom filter using the additional overrides of the rules; and
sending the incremental update of the bloom filter to each one of the one or more application systems to cache as an update to the cached bloom filter.

6. The system of claim 5, wherein:
the additional overrides of the rules are stored to the overrides repository; and
the additional overrides of the rules are buffered in an incremental buffer at the rules engine.

7. The system of claim 6, wherein after the incremental buffer has been updated with the additional overrides of the rules on one or more occasions, the first computing instructions, when executed on the one or more first processors of the rules engine further perform:
generating a new bloom filter to replace the bloom filter; and
sending the new bloom filter from the rules engine to the one or more application systems to replace the cached bloom filter.

8. The system of claim 7, wherein the incremental buffer is flushed when the new bloom filter is generated.

9. The system of claim 7, wherein the new bloom filter is generated on a periodic basis.

10. A method comprising:
receiving, at a rules engine using first computing instructions, overrides of rules of a current set of rules cached in one or more application systems that are separate from the rules engine, wherein the overrides of rules are separate from the rules, and wherein each override of the overrides modify one or more of the rules applicable to the one or more application systems by:
implementing, via the rules engine, a respective functionality to one or more rules of the current set of rules based on one or more exceptions to the one or more rules of the current set of rules; and
checking, via the rules engine, for an existence of each of the overrides corresponding to the one or more application systems by using multiple hops from each application system of the one or more application systems to the rules engine;
storing the overrides of the rules in an overrides repository in the rules engine;
generating a bloom filter using the overrides of the rules based on a probabilistic data structure, wherein the bloom filter allows the one or more application systems to determine locally at one or more second processors whether an override of the overrides corresponding to the one or more application systems exists without calling the rules engine; and
sending the bloom filter from the rules engine to the one or more application systems; and
second computing instructions of the one or more application systems, when executed on one or more second processors of the one or more application systems, performing:
receiving the bloom filter corresponding to the one or more application systems from the rules engine, wherein the bloom filter stores the one or more exceptions;
storing the bloom filter as a cached bloom filter at the one or more application systems;
receiving, at the one or more application systems, a request to evaluate the rules and check for the overrides of the rules; and
determining, at the one or more application systems using the cached bloom filter, whether to apply any of the overrides of the rules to the request by:
determining, when there is an update to the cached bloom filter, to call the rules engine to check for the overrides of the rules; and
determining, when there is no current update to the cached bloom filter, to not call the rules engine to check for the overrides of the rules and to apply any of the overrides of the rules to the request locally at the one or more second processors to thereby reduce network usage, free up computation resources at the one or more first processors, or decrease a storage footprint.

11. The method of claim 10, further comprising:
after calling the rules engine to check for the overrides of the rules,
implementing, by the one or more application systems, one or more respective functionalities based on the one or more exceptions to the one or more rules of the current set of rules further based on the one or more of the overrides.

12. The method of claim 10, wherein:
the one or more application systems further store cached rules received from the rules engine;
the probabilistic data structure further comprises a streaming probabilistic data structure; and
the method further comprises:
applying, by the one or more application systems, the cached rules to the request.

13. The method of claim 10, wherein the cached bloom filter is customized by an execution engine of the rules engine for each of the one or more application systems.

14. The method of claim 10, further comprising:
receiving, at the rules engine, additional overrides of the rules corresponding to the one or more application systems;
generating, by the rules engine, an incremental update of the bloom filter using the additional overrides of the rules; and
sending the incremental update of the bloom filter to each one of the one or more application systems to cache as an update to the cached bloom filter.

15. The method of claim 14, wherein:
the additional overrides of the rules are stored to the overrides repository; and
the additional overrides of the rules are buffered in an incremental buffer at the rules engine.

16. The method of claim 15, further comprising, after the incremental buffer has been updated with the additional overrides of the rules on one or more occasions:
generating a new bloom filter to replace the bloom filter; and
sending the new bloom filter from the rules engine to the one or more application systems to replace the cached bloom filter.

17. The method of claim 16, wherein the incremental buffer is flushed when the new bloom filter is generated.

18. The method of claim 16, wherein the new bloom filter is generated on a periodic basis.

19. A non-transitory computer-readable medium storing instructions, wherein the instructions, upon execution by a processor, cause the processor to perform operations comprising:
a rules engine comprising one or more first processors and one or more first non-transitory computer-readable media storing first computing instructions; and
one or more application systems comprising one or more second processors and one or more second non-transitory computer-readable media storing second computing instructions, wherein the one or more application systems are in communication with the rules engine via a network,
wherein:
the first computing instructions of the rules engine, when executed by the one or more first processors of the rules engine, perform:
receiving, at the rules engine, overrides of rules of a current set of rules cached in the one or more application systems that are separate from the rules engine, wherein the overrides of the rules are separate from the rules, and wherein each override of the overrides modify one or more of the rules applicable to the one or more application systems by:
implementing, via the rules engine, a respective functionality to one or more rules of the current set of rules based on one or more exceptions to the one or more rules of the current set of rules; and
checking, via the rules engine, for an existence of each of the overrides corresponding to the one or more application systems by using multiple hops from each application system of the one or more application systems to the rules engine;
storing the overrides of the rules in an overrides repository in the rules engine;

generating a bloom filter using the overrides of the rules based on a probabilistic data structure, wherein the bloom filter allows the one or more application systems to determine locally at the one or more second processors whether an override of the overrides corresponding to the one or more application systems exists without calling the rules engine; and sending the bloom filter from the rules engine to the one or more application systems; and the second computing instructions of the one or more application systems, when executed on the one or more second processors of the one or more application systems, perform:

receiving the bloom filter corresponding to the one or more application systems from the rules engine, wherein the bloom filter stores the one or more exceptions;

storing the bloom filter as a cached bloom filter at the one or more application systems;

receiving, at the one or more application systems, a request to evaluate the rules and check for the overrides of the rules; and determining, at the one or more application systems using the cached bloom filter, whether to apply any of the overrides of the rules to the request by:

determining, when there is an update to the cached bloom filter, to call the rules engine to check for the overrides of the rules; and determining, when there is no current update to the cached bloom filter, to not call the rules engine to check for the overrides of the rules and to apply any of the overrides of the rules to the request locally at the one or more second processors to thereby reduce network usage, free up computation resources at the one or more first processors, or decrease a storage footprint.

20. The non-transitory computer-readable medium of claim 19, wherein the cached bloom filter is customized by an execution engine of the rules engine for each of the one or more application systems.

* * * * *